June 16, 1936.  L. E. WIGGINS  2,044,267
FILM MAGAZINE
Filed April 14, 1934   2 Sheets-Sheet 1
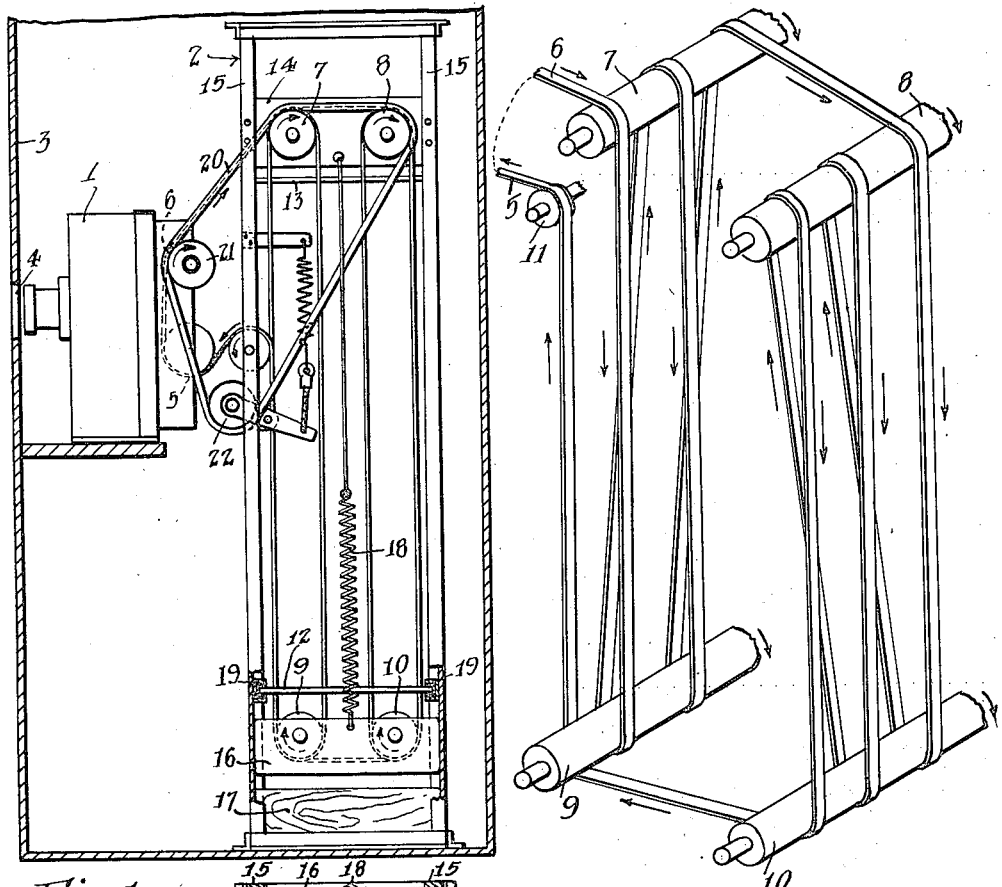
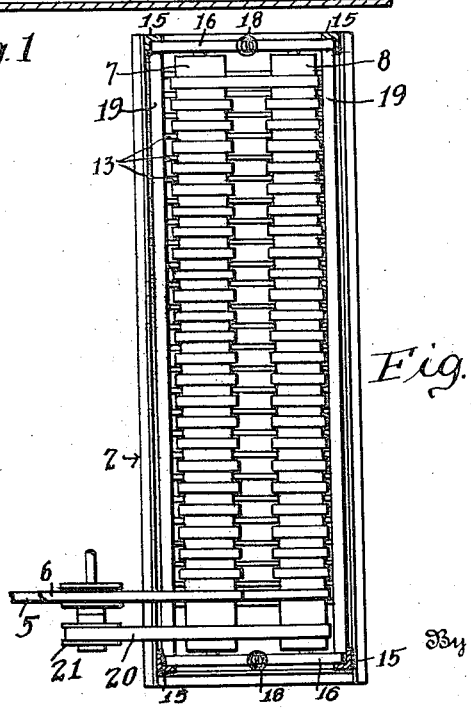
Fig.1
Fig.2
Fig.4
Inventor
Lynn E. Wiggins
By Lyon & Lyon
Attorney June 16, 1936.   L. E. WIGGINS   2,044,267
FILM MAGAZINE
Filed April 14, 1934   2 Sheets-Sheet 2
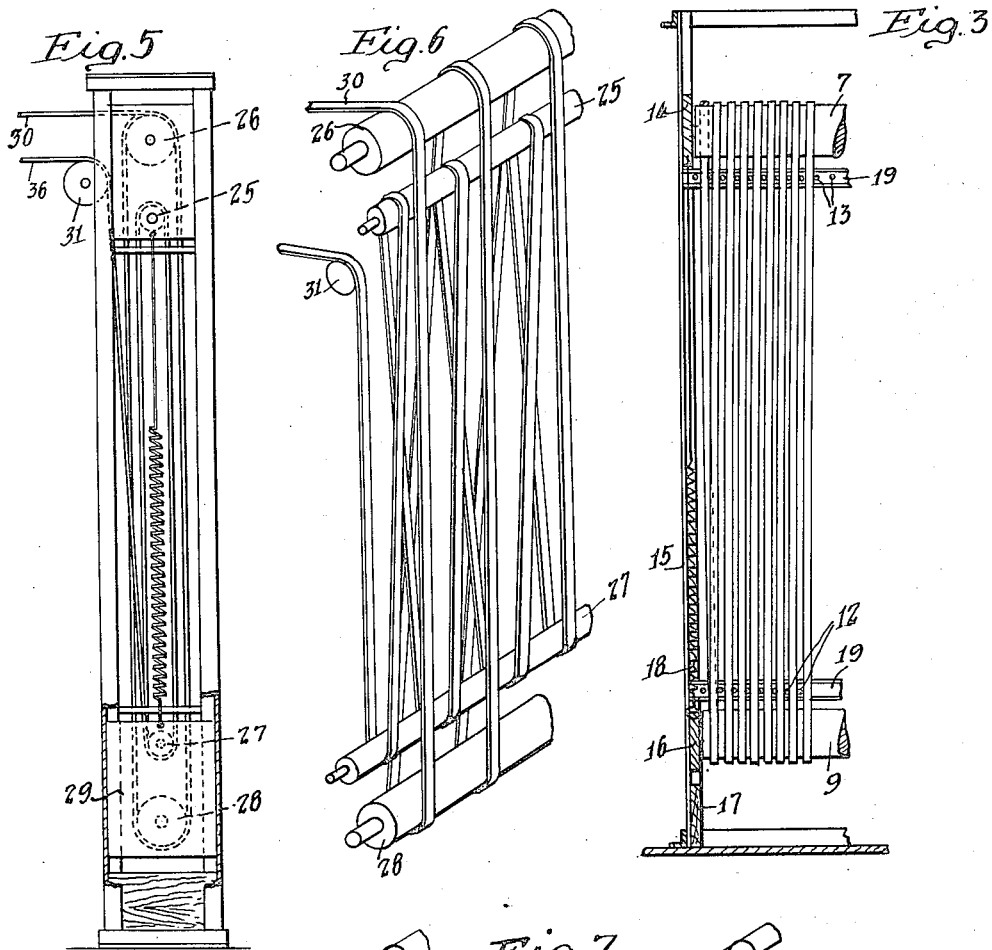
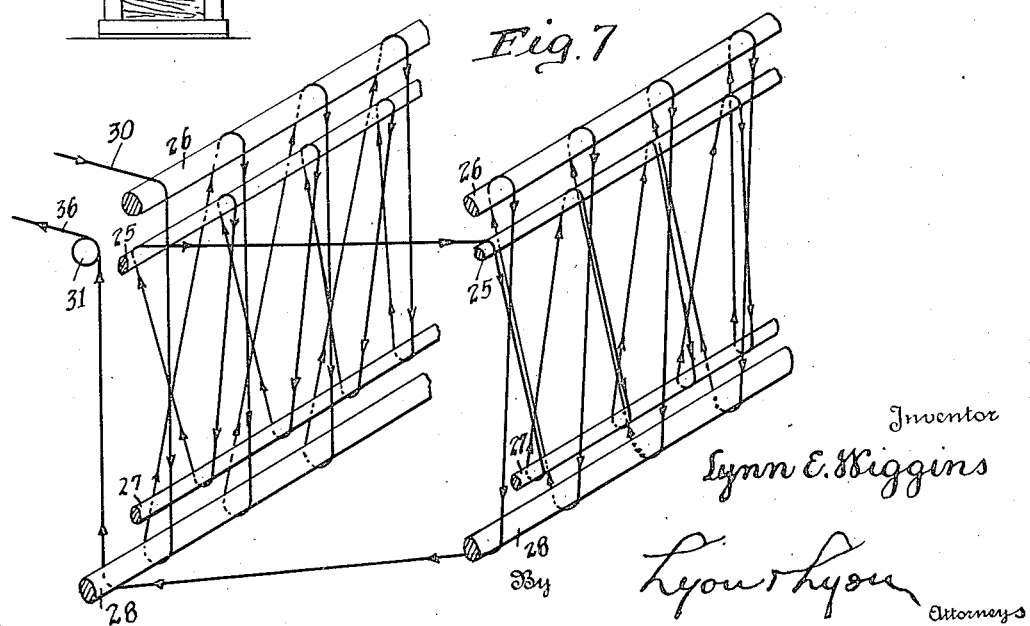
Inventor
Lynn E. Wiggins
By Lyon & Lyon
Attorneys Patented June 16, 1936

2,044,267

UNITED STATES PATENT OFFICE 2,044,267

FILM MAGAZINE

Lynn E. Wiggins, El Monte, Calif.

Application April 14, 1934, Serial No. 720,588

2 Claims. (Cl. 88—18.7)

This invention relates to the art of continuously projecting motion pictures from endless films and has as a broad object to provide a simple and efficient film magazine for supporting an endless film of substantial length and continuously feeding a loop of the film to and taking it away from a projector.

Many attempts have been made to construct satisfactory magazines for handling endless motion picture films but to the best of my knowledge all of the prior machines developed for this purpose, if otherwise satisfactory, have been objectionable in that they imposed severe stresses on the film, causing it to break after being exhibited a relatively small number of times as compared to the normal useful life of the same film when operated discontinuously in a standard projector by simply rewinding it from one reel to another.

All prior machines for handling endless films of substantial length with which I am familiar feed the film through a tortuous path, the discharge end of which is a substantial distance away from and out of alignment with the intake end, thereby necessitating the guiding of the film through a return path having reverse bends or twists to bring it back to the starting point. Observations of these machines in operation indicates to me that the breakdown of the film occurs as a result of the reverse bending and/or twisting to which it is subjected.

In accordance with the present invention I provide a unique arrangement of rollers and guides which movably support a relatively great length of endless film in compact space without introducing any short bends, short twists or reverse bends into the film and yet maintains the film in a closed path from which a loop may be taken off to a projector at any desired point. The exact manner in which this is accomplished will be described in detail with reference to the drawings, in which Fig. 1 is an end elevation view partly in section of an assembly employing a magazine in accordance with the invention in combination with a projector;

Fig. 2 is a top view of the magazine illustrated in Fig. 1 with the upper end of the supporting frame cut away;

Fig. 3 is a side elevation partly in section of a portion of the magazine shown in Figs. 1 and 2;

Fig. 4 is a schematic diagram showing the path of the film through the magazine shown in Figs. 1 to 3;

Fig. 5 is an end elevation view, with parts broken away, of a modified form of magazine;

Fig. 6 is a schematic diagram showing the path of the film through the magazine shown in Fig. 5; and Fig. 7 is a schematic diagram showing how two magazine units of the type illustrated in Fig. 5 may be employed in combination to provide a greater film capacity.

Referring first to Fig. 1, I have illustrated a projector 1 and a film magazine 2 for supporting an endless film mounted within a cabinet, only the side and bottom walls of the cabinet being shown. The projector 1 may be of standard construction adapted for use either with silent or sound films and for that reason is not illustrated in detail. The projector is positioned to project a picture through an aperture 4 in the wall of the cabinet 3 onto a screen positioned at a suitable distance from the cabinet.

It will be observed that a loop of film is shown entering the projector 1 at point 5 and leaving the projector at point 6. The film leaving the projector at point 6 enters the magazine 2, extends back and forth in the magazine through a tortuous path of sufficient length to accommodate the desired length of film and thereafter leaves the magazine and reenters the projector at point 5.

Within the magazine 2 the film is supported in a series of loops between a pair of upper rollers 7 and 8, respectively, and a pair of lower rollers 9 and 10, respectively, roller 9 being positioned directly below roller 7, and roller 10 being positioned directly below roller 8.

Referring now to Fig. 4, it will be observed that the film entering the magazine at point 6 passes first over roller 7, thence directly downward and under roller 9, then back up over roller 7, the film being shifted slightly longitudinally of the rollers while passing from the lower roller 9 to the upper roller 7 to cause it to pass over roller 7 at a point spaced slightly longitudinally from the preceding loop. The film continues to loop successively about the rollers 7 and 9 until it reaches the end of roller 7; thereafter it passes directly from roller 7 to and over the upper roller 8, thence down under roller 10, and back up to roller 8, being displaced longitudinally along roller 8 a slight distance in the opposite direction to the displacement of successive loops on roller 7. The film is wound about rollers 8 and 10 until it reaches the end of roller 10 whereupon it is fed across to and under roller 9 and thence upwardly to a point adjacent the roller 7 where it is drawn over an idler pulley 11 and delivered to the projector at point 5.

It will be observed from Fig. 4 that by placing the same number of loops of film on rollers 7 and 9 as upon rollers 8 and 10, the film will be returned to point 5, which is adjacent the starting point 6, without twisting the film, without giving it a single reverse bend prior to its discharge from the magazine over the idler roller 11 and without introducing any other lateral deflection into the film other than that necessary to shift it by slightly over its own width while passing from the lower rollers 9 and 10 to the associated upper rollers 7 and 8. As clearly shown in Fig. 3, the edgewise deflection of the film necessary to shift it longitudinally during passage between the lower and upper rollers is very slight. For instance, in a typical machine the lower and upper rollers may be spaced approximately sixty inches apart and the film displaced laterally a matter of one or two inches during its passage between the upper and lower rollers.

I have found that the film runs more smoothly and with less wear and strain if it passes over the rollers concentrically, that is, if the center line of the film remains in a plane perpendicular to the axis of each roller while it is passing around that roller. To this end, I provide lower guide rods 12 and upper guide rods 13 immediately above the lower rollers and below the upper rollers, respectively, for engaging the edges of the films and maintaining it in a desired path. The rods 12 and 13, as clearly shown in Fig. 2, extend clear across the magazine and each pair of rods functions to guide the film over both upper or both lower rollers, as the case may be. It will be observed (Fig. 2) that the film in passing over the upper rollers feeds between the same pair of guides 13 as it approaches and leaves the roller, thereby maintaining the film in a path concentrically about the roller but (referring to Fig. 3) it will be observed that during passage of the film from one of the lower rollers 9 or 10 to the associated upper rollers 7 or 8, the film is shifted laterally (or longitudinally with respect to the rollers) the distance equal to the spacing between successive rods 13.

The upper rollers 7 and 8 are rotatably mounted in journals in stationary cross members 14 secured at opposite ends to the vertical frame members 15 of the magazine so that the positions of these rollers are fixed relative to the magazine frame and the projector 1. However, to permit changes in the length of the loops of film extending between the upper and lower rollers due to temperature or humidity changes, the lower rollers 9 and 10 are journaled at each end in bearings in floating cross members 16, these cross members being guided for free vertical movement within the frame members 15 which, as clearly shown in Fig. 2, are angles in cross section. Downward movement of the cross members 16 is limited by blocks 17 positioned therebelow. This limitation in the downward movement of the cross members 16 is provided so that in case the loops at one end of the rollers should become longer than the loops at the other end, the cross members 16 at the lower end would contact with the block 17 thereunder preventing further downward movement of the cross members 16 and thereby permitting the film loops at the low end of the rollers to become slack. This slack will be then gradually taken up by slippage of the film, (the film moving constantly with respect to the rollers) because of the fact that tension will still be applied to the film at the high end of the lower rollers 9 and 10 because of the fact that the weight of those rollers will be in large part supported by the film loops. It has been found in practice that the lower rollers 9 and 10 tend to equalize and maintain a horizontal position with the cross members 16 clear of the stop blocks 17.

I have shown in Fig. 1 a spring 18 for partially supporting the weight of the cross members 16 and the rollers 9 and 10. The springs 18 (there being one at each end of the rollers) aid in maintaining the lower rollers at a desired level but are not really essential except where a short film is employed that does not completely fill the rollers. In this instance, the spring 18 at the empty end of the machine serves to support the weight of the ends of the lower rollers 9 and 10, which would be supported by the film if the magazine were completely filled.

The guide rods 12 and 13 are preferably of some hard smooth material, such as glass, to reduce as much as possible friction between the rods and the film, and may be supported at opposite ends by longitudinal frame members 19 in which the rods are imbedded, the frame members 19 being secured at opposite ends to the vertical frame members 15.

In order to reduce the strain on the film in the magazine as much as possible, it is desirable to drive the upper rollers by some means independent of the film itself. In the embodiment shown in Fig. 1 this drive is obtained with a belt 20 which loops over the ends of the upper rollers 7 and 8, a drive pulley 21 on the projector 1, and an idler pulley 22 which maintains the belt in top condition. The driving pulley 21 on the projector is geared to the projector film feeding mechanism so as to drive the belt 20 at exactly the same linear speed as the film is moved through the projector.

The construction disclosed in Figs. 1, 2 and 3 functions in a very satisfactory manner but in some instances where space is at a premium the modified construction disclosed in Fig. 5 may be employed in which one of the upper rollers 25 is smaller than the other upper roller 26 and is positioned immediately therebelow, the lower rollers 27 and 28 being similarly dimensioned to the respective upper rollers and the smaller roller 27 being positioned directly above the larger roller 28. The mounting of the rollers for free rotation in the machine of Fig. 5 is exactly the same as in the machine illustrated in Fig. 1. Thus both upper rollers 25 and 26 are journaled in stationary members secured to the frame whereas the two lower rollers 27 and 28 are journaled in a plate 29 which is slidable vertically to permit stretching and contraction of the film loops. The threading of the film through the machine shown in Fig. 5 is clearly shown in the schematic diagram of Fig. 6. Thus the film enters the machine at point 30, passing over the upper roller 26, thence down below the large lower roller 28, back up and over rollers 26, and so on until the ends of these rollers are reached. Thereafter the film after leaving the large upper roller 26 at the end thereof passes down below the small lower roller 27, thence up and over the small upper roller 25, looping around these two rollers until it is back adjacent the starting point where it is taken away from the small lower roller 27 and over an idler pulley 31 back into the projector (not shown).

Of course, the capacities of both the magazines illustrated in Figs. 1, 2 and 3 and in Fig. 5 may be increased within certain limits by increasing the lengths of the rollers. However, the capacities of these machines may be further increased if it is desired to do so by mounting several units, such as those shown, alongside of each other. Thus there is shown in Fig. 7 a schematic diagram showing how the film would be threaded through a machine comprising two units, each corresponding to the construction shown in Fig. 5. It will be observed that the film, after entering one machine at point 30, and passing therethrough in exactly the manner described in connection with Fig. 6, instead of being taken away from the small lower roller 27, over an idler pulley and back to the projector, is continued up over the smaller upper roller 25, thence over to the small upper roller 25 of the second unit positioned alongside and wound back and forth over the small upper and lower rollers 25 and 27, respectively, to the end thereof, thence from the small lower roller 27 to the large upper roller 26 and then about the larger upper and lower rollers back to a point adjacent the starting point, where it is delivered from the large lower roller 28 back to the corresponding roller in the first unit, and thence up over the idler pulley 31 back to the projector at point 36.

It will be observed that it is possible to employ as many complete units of the type disclosed in Fig. 5 as is desired for the reason that each unit returns the film to a point as close as may be desired to the point of entry, hence avoiding any necessity of twisting or bending the film over a series of idler rollers to convey it from the discharge end of one unit to the entering end of another unit.

It will also be apparent that since my machine guides the film in a closed path within the magazine itself, the loop extending to the projector may be taken off at any desired point and not merely at one end, as shown in the drawings. If it were desirable to position the projector near the middle of the magazine instead of adjacent one end, as shown in Figs. 1 and 2, then the portions 5 and 6 of the film would be connected directly together, and a loop of film taken away from the magazine at a point directly in line with the projector.

An important reason for the success of my machine resides in the fact that the same side of the film always contacts the rollers. Therefore, by placing the rear face of the film against the rollers, the emulsion face of the film is prevented from contacting any surfaces during the passage through the machine. This greatly lengthens the useful life of the film, since no defacement of the picture or sound track (in the case of sound film) can occur in the magazine. In machines in which both faces of the film contact the film supporting elements, attempts have been made to prevent defacement of the emulsion by employing shouldered pulleys, which engaged only the edges of the films. Although this protects the picture area of the film, it increases the wear on the more delicate sound track, which is located on one margin of the film.

It is to be understood that although two specific embodiments have been disclosed and described for the purpose of adequately explaining the invention, the particular construction disclosed may be varied in many ways without departing from the invention, and the latter is therefore to be limited only as set forth in the appended claims.

I claim:
1. A machine for supporting a continuously moving endless motion picture film of substantial length within a compact space, comprising an even number of sets of film-supporting and feeding rollers of substantial length relative to the width of the film to be supported, each set consisting of a lower horizontal roller and an upper horizontal roller parallel to the lower roller and positioned a substantial distance thereabove, the upper rollers of the different sets being closely positioned parallel to and alongside each other, and the lower rollers of the different sets likewise being closely positioned parallel to and alongside each other, guide means for maintaining an endless film wound always in the same direction over the upper roller and under the lower roller of each set in a flattened helical path from one end to the other of the rollers of that set, and wound always in the same direction over the rollers of the different sets, thence to the adjacent end of the next set of rollers and from the last set of rollers directly back to the starting point on the first set of rollers, whereby the film is movably supported in a closed path with all portions of the film parallel to a common axis, and guide means for taking off a closed loop of film from said closed path to a projector, each of said rollers comprising a smooth continuous cylinder and said first mentioned guide means being independent and separate from and out of contact with said rollers, said lower rollers being slidably mounted for free vertical movement within limits, the weight of the rollers being normally in part supported by the film looped thereunder, and a spring means at each end of each pair of said lower rollers for in part supporting the weight of those rollers.

2. A machine for supporting a continuously moving endless motion picture film of substantial length within a compact space, comprising an even number of sets of film-supporting and feeding rollers of substantial length relative to the width of the film to be supported, each set consisting of a lower horizontal roller and an upper horizontal roller parallel to the lower roller and positioned a substantial distance thereabove, the upper rollers of the different sets being closely positioned parallel to and alongside each other, and the lower rollers of the different sets likewise being closely positioned parallel to and alongside each other, guide means for maintaining an endless film wound always in the same direction over the upper roller and under the lower roller of each set in a flattened helical path from one end to the other of the rollers of that set, and wound always in the same direction over the rollers of the different sets, thence to the adjacent end of the next set of rollers and from the last set of rollers directly back to the starting point on the first set of rollers, whereby the film is movably supported in a closed path with all portions of the film parallel to a common axis, guide means for taking off a closed loop of film from said closed path to a projector, each of said rollers comprising a smooth continuous cylinder and said first mentioned guide means being independent and separate from and out of contact with said rollers, and driving means consisting of a belt in driving engagement with the cylindrical surface of at least one of said rollers and means for driving said belt at the same linear speed as that of the film.

LYNN E. WIGGINS.